Feb. 20, 1951 J. W. DEHN ET AL 2,542,800

VARIABLE TIMED RELEASE FOR REGISTERS CONTROLLED BY REGISTER GROUP BUSY MEANS

Filed Oct. 29, 1948 8 Sheets-Sheet 1

INVENTORS J. W. DEHN
R. E. HERSEY
A. C. MEHRING

BY P. C. Smith

ATTORNEY

Feb. 20, 1951 J. W. DEHN ET AL 2,542,800

VARIABLE TIMED RELEASE FOR REGISTERS CONTROLLED BY REGISTER GROUP BUSY MEANS

Filed Oct. 29, 1948 8 Sheets-Sheet 2

INVENTORS J. W. DEHN
R. E. HERSEY
A. C. MEHRING

BY P. C. Smith

ATTORNEY

Feb. 20, 1951 J. W. DEHN ET AL 2,542,800

VARIABLE TIMED RELEASE FOR REGISTERS CONTROLLED BY REGISTER GROUP BUSY MEANS

Filed Oct. 29, 1948 8 Sheets-Sheet 3

INVENTORS J. W. DEHN
R. E. HERSEY
A. C. MEHRING

BY P. C. Smith

ATTORNEY

INVENTORS J. W. DEHN
R. E. HERSEY
A. C. MEHRING
BY P. C. Smith
ATTORNEY

VARIABLE TIMED RELEASE FOR REGISTERS CONTROLLED BY REGISTER GROUP BUSY MEANS

Filed Oct. 29, 1948 8 Sheets-Sheet 5

INVENTORS J. W. DEHN
R. E. HERSEY
A. C. MEHRING
BY P. C. Smith
ATTORNEY

INVENTORS J. W. DEHN
R. E. HERSEY
A. C. MEHRING
BY P. C. Smith
ATTORNEY

INVENTORS J. W. DEHN
R. E. HERSEY
A. C. MEHRING
BY P. C. Smith
ATTORNEY

VARIABLE TIMED RELEASE FOR REGISTERS CONTROLLED
BY REGISTER GROUP BUSY MEANS
Filed Oct. 29, 1948 8 Sheets-Sheet 8

INVENTORS J. W. DEHN
R. E. HERSEY
A. C. MEHRING
BY P. C. Smith
ATTORNEY

Patented Feb. 20, 1951

2,542,800

UNITED STATES PATENT OFFICE 2,542,800

VARIABLE TIMED RELEASE FOR REGISTERS CONTROLLED BY REGISTER GROUP BUSY MEANS

Joseph W. Dehn, Great Neck, N. Y., and Ralph E. Hersey, Madison, and Arthur C. Mehring, Cranford, N. J., assignors to Bell Telephone Laboratories, Incorporated, New York, N. Y., a corporation of New York Application October 29, 1948, Serial No. 57,399

7 Claims. (Cl. 179—18)

This invention relates to telephone systems in which connections between subscribers' lines are established by automatic switching equipment and more particularly to a timing circuit arranged, under overload conditions when an all register busy condition is encountered, for reducing the partial dial interdigital and permanent signal timing periods whereby the holding time of the register is reduced and the register is sooner made available for service on awaiting calls.

The invention is specifically applicable to a system of the cross bar type such as is disclosed in the application of A. J. Busch, Serial No. 57,394, filed concurrently herewith.

In a system of this type when a subscriber originates a call, a marker is associated with his line over a marker connector and in responding to the call establishes a connection from the calling line through the primary and secondary cross bar switches of the line-link frame on which the calling line terminates and the primary and secondary switches of a trunk-link frame to an idle dial pulse originating register circuit. Each register has a tip, ring and sleeve appearance on a trunk-link frame just as a trunk does and the operation of selecting a register and connecting a calling line to it is the same as selecting a trunk and connecting a line to it. These selecting functions, as carried out by the marker, have been described in the application of R. E. Hersey Serial No. 57,397, filed concurrently herewith. This connection between the calling line and register is called the dial tone connection and gets its name from the fact that dial tone is supplied to the calling line over this connection when the register is ready to receive dial pulses.

While the marker is in the process of establishing this dial tone connection, it records certain information concerning the calling line on memory relays in the register because the marker which sets up the originating connection from the calling line to a trunk will need this information. This information is passed to the register by way of the trunk-link and connector circuits. This information consists of the class of the calling line, the location of the line on line switches of the line-link frame and the line-link used in the dial tone connection. At the same time the marker informs the register if the calling line is a coin line, a two-party register message rate line or a manual line in order that the register may take action peculiar to the type of the call.

After the register has been seized by a marker and has been connected with the calling line, it transmits dial tone to the calling line to inform the subscriber that he may proceed to dial the digits of the wanted line designation. The impulses of each dialed digit are counted in the register and a plurality of registers are set in response to the counting of the impulses of successively dialed digits to register the digits of the desired connection.

A register timing circuit is provided in the originating register which measures time for the important functions of the register to be completed. If a function is completed in the time allowed, the timer resets itself and measures time for the next function. If the function is not completed in the time allowed, the timer times out and causes the register to take the appropriate action. If the timer times out awaiting the dialing of a first digit, it engages a marker and requests a connection to a permanent signal trunk. If the timer times out awaiting the dialing of other digits, as on a partially dialed call, it engages a marker and requests a connection to a partial dial trunk. The time out intervals are normally from 20 to 35 seconds. When however the traffic load in the office is heavy and the marker encounters a condition where no idle registers are available, it becomes desirable to reduce these timing intervals to a minimum in order that the registers may be dismissed more quickly and made available for awaiting calls.

It is therefore the object of the present invention to reduce the time intervals normally measured while awaiting the dialing of a first or subsequent digits.

For measuring the timing intervals for the important functions of the register, a condenser resistance timing circuit is provided the resistance of which may be altered to determine the different time intervals required to charge the condenser. The condenser is associated with the control gap circuit of a gas-filled tube so that when the condenser becomes charged to the breakdown potential of the tube, the tube fires to cause the operation of a relay connected into its main cathode-anode circuit to indicate the termination of the measured time interval.

To attain the aforesaid object of the invention, a relay is associated with the register timing circuit which is operated under the control of an associated group busy circuit when a marker finds all registers to be busy, which relay changes the resistance in the charging circuit of the condenser so that in measuring the interval while the register is awaiting the dialing of a first digit, the measured charging time will be reduced from 20 to 35 seconds to 10 to 17 seconds and the interval while the register is awaiting the dialing of other digits will be reduced from 20 to 35 seconds to 5 to 8 seconds.

The invention having been briefly described, it is believed that a clearer comprehension of the invention may be secured from the following detailed description when read in connection with the accompanying drawings in which:

Figs. 1 to 6 inclusive and the upper portion of Fig. 7 show such portions of an originating register as are deemed necessary to fully illustrate the invention;

Fig. 7 in the lower portion thereof shows a group busy circuit common to a plurality of registers;

Figure 1:
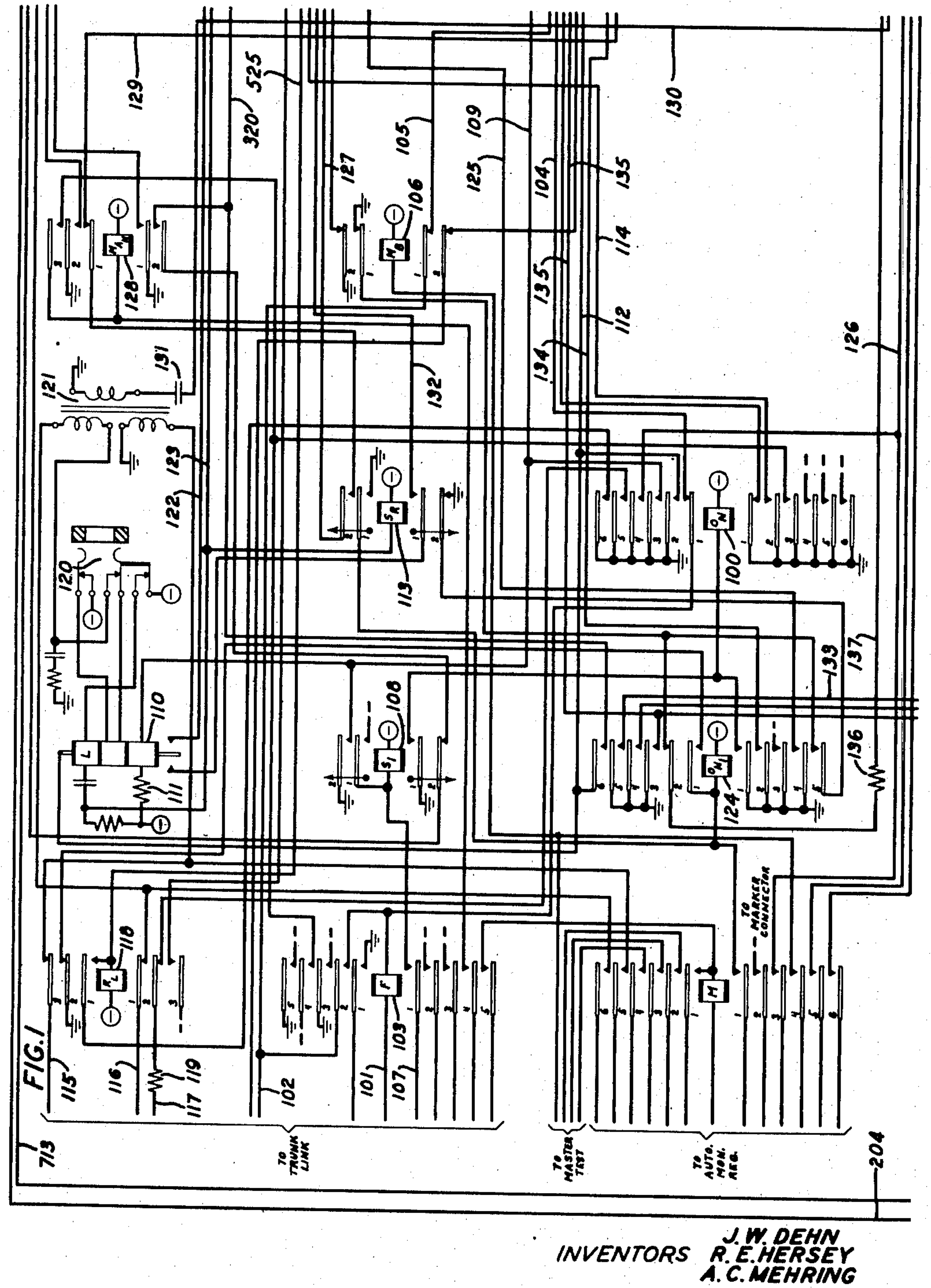
Figure 2:
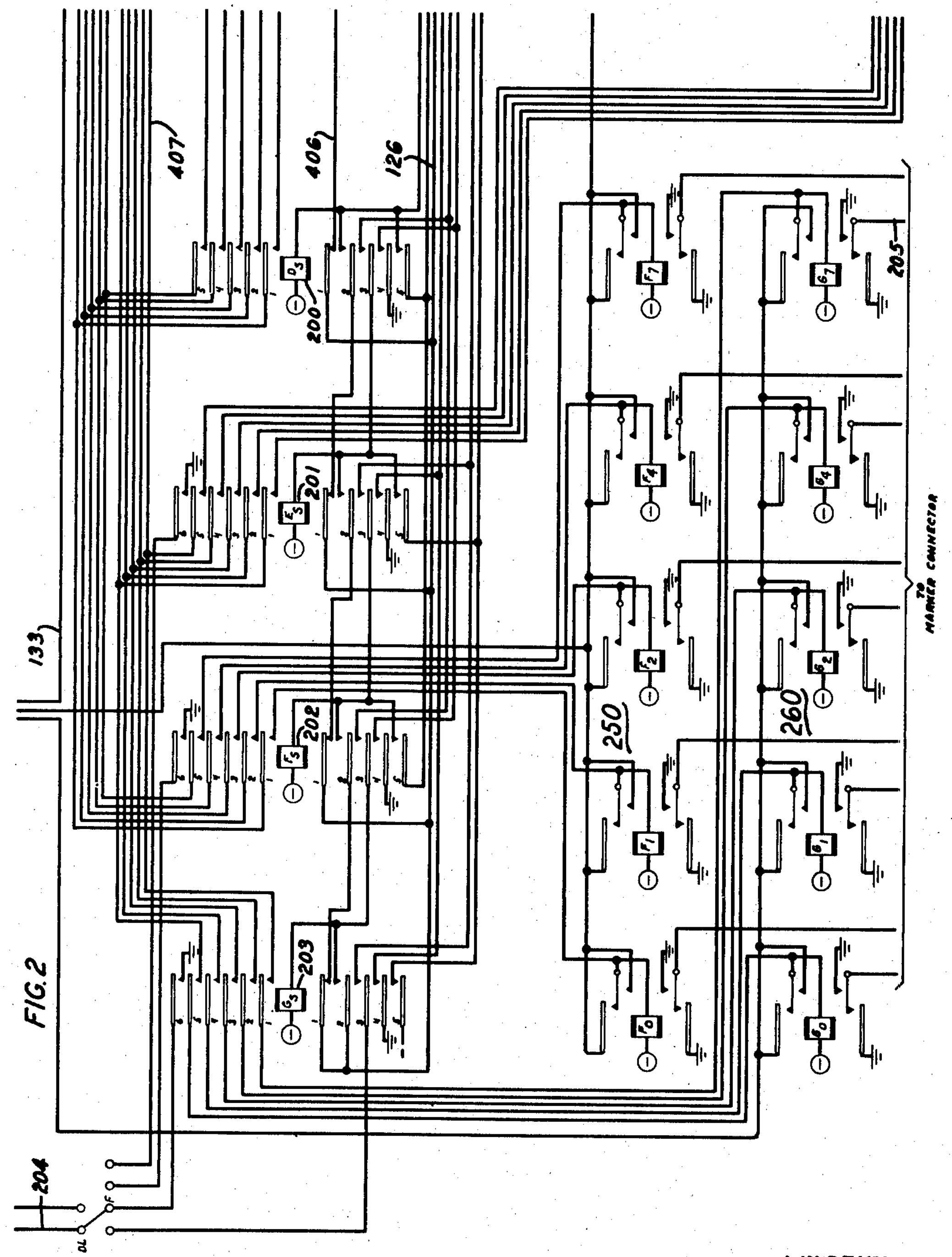
Figure 3:
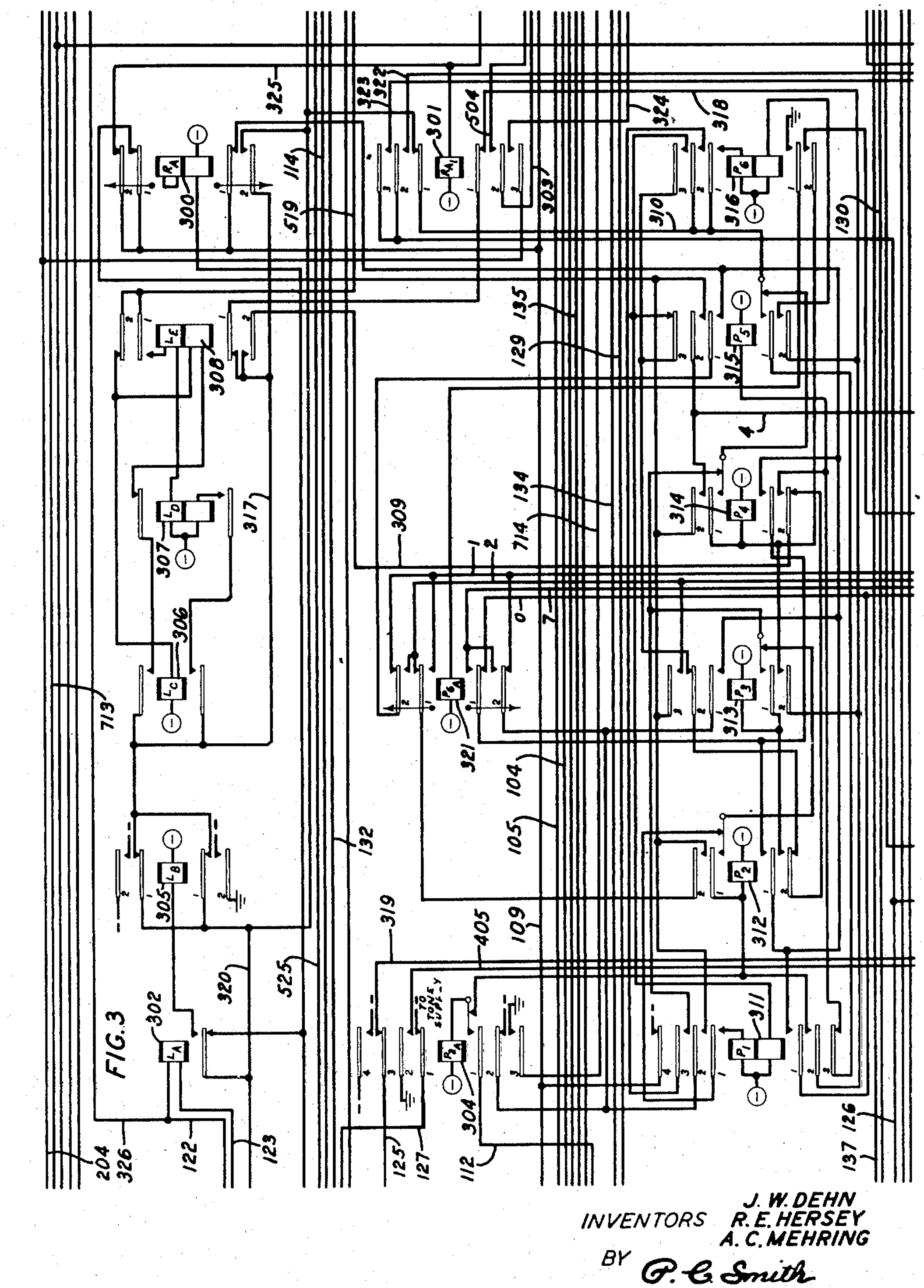
Figure 4:
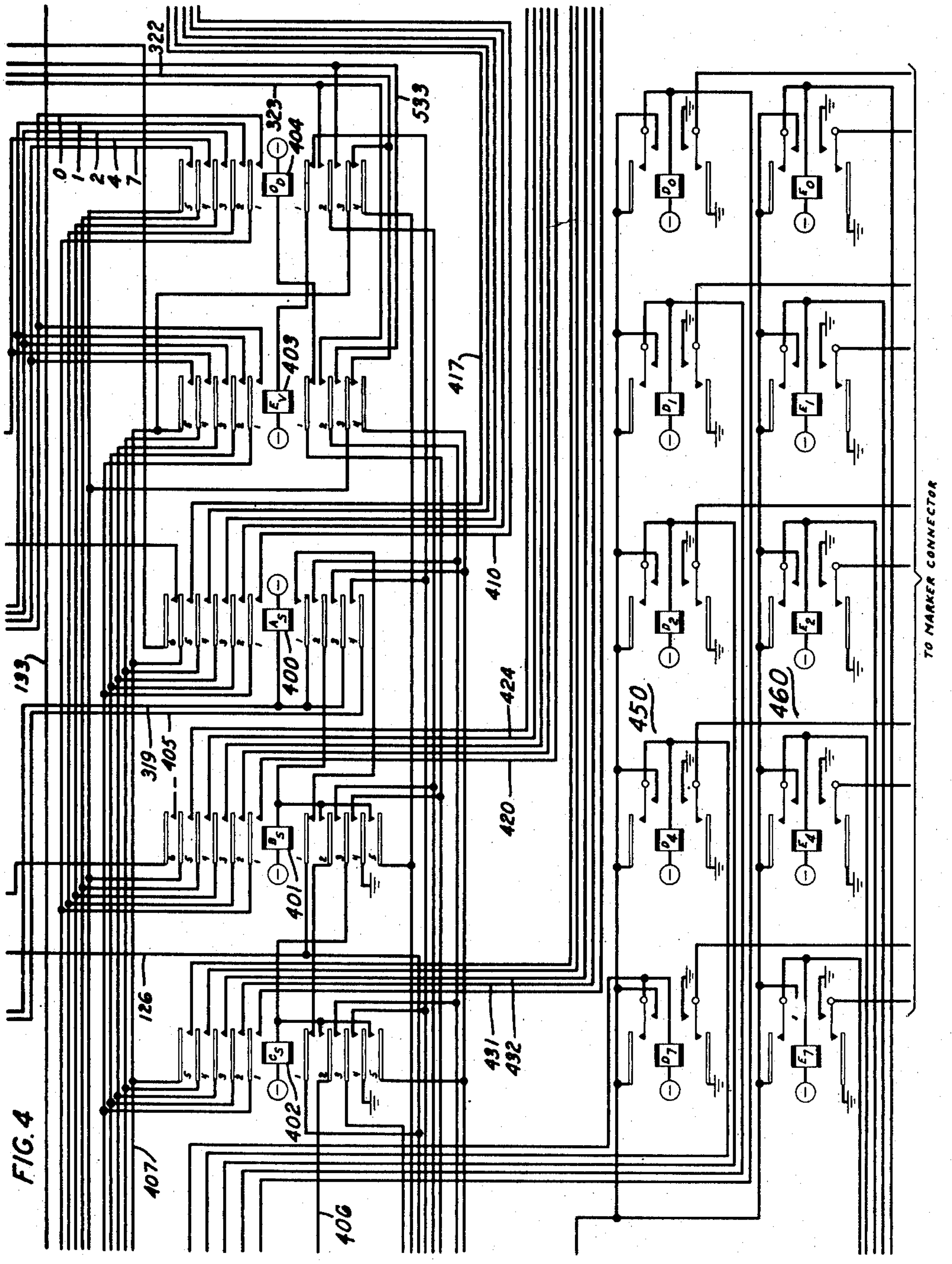
Figure 5:
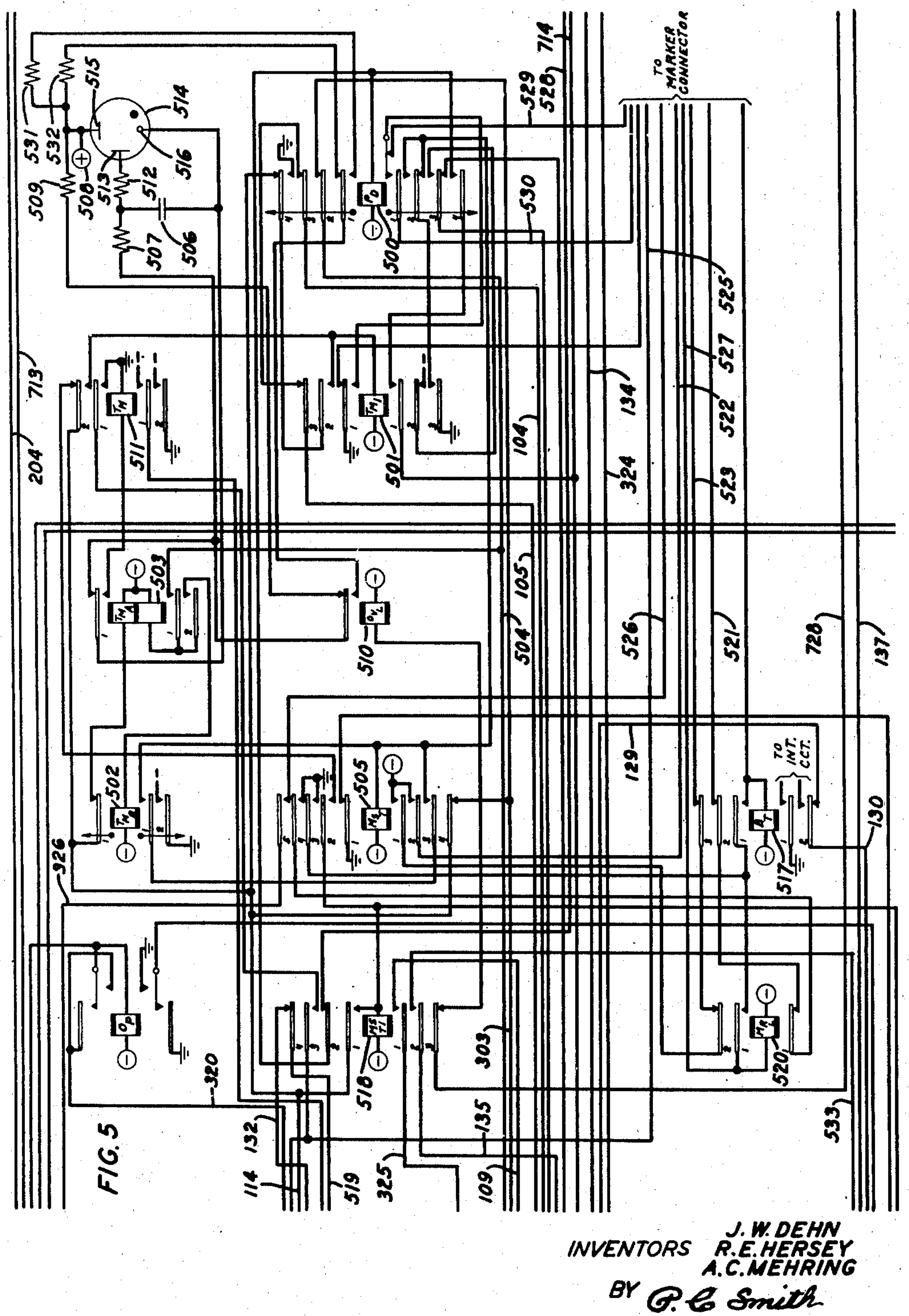
Figure 6:
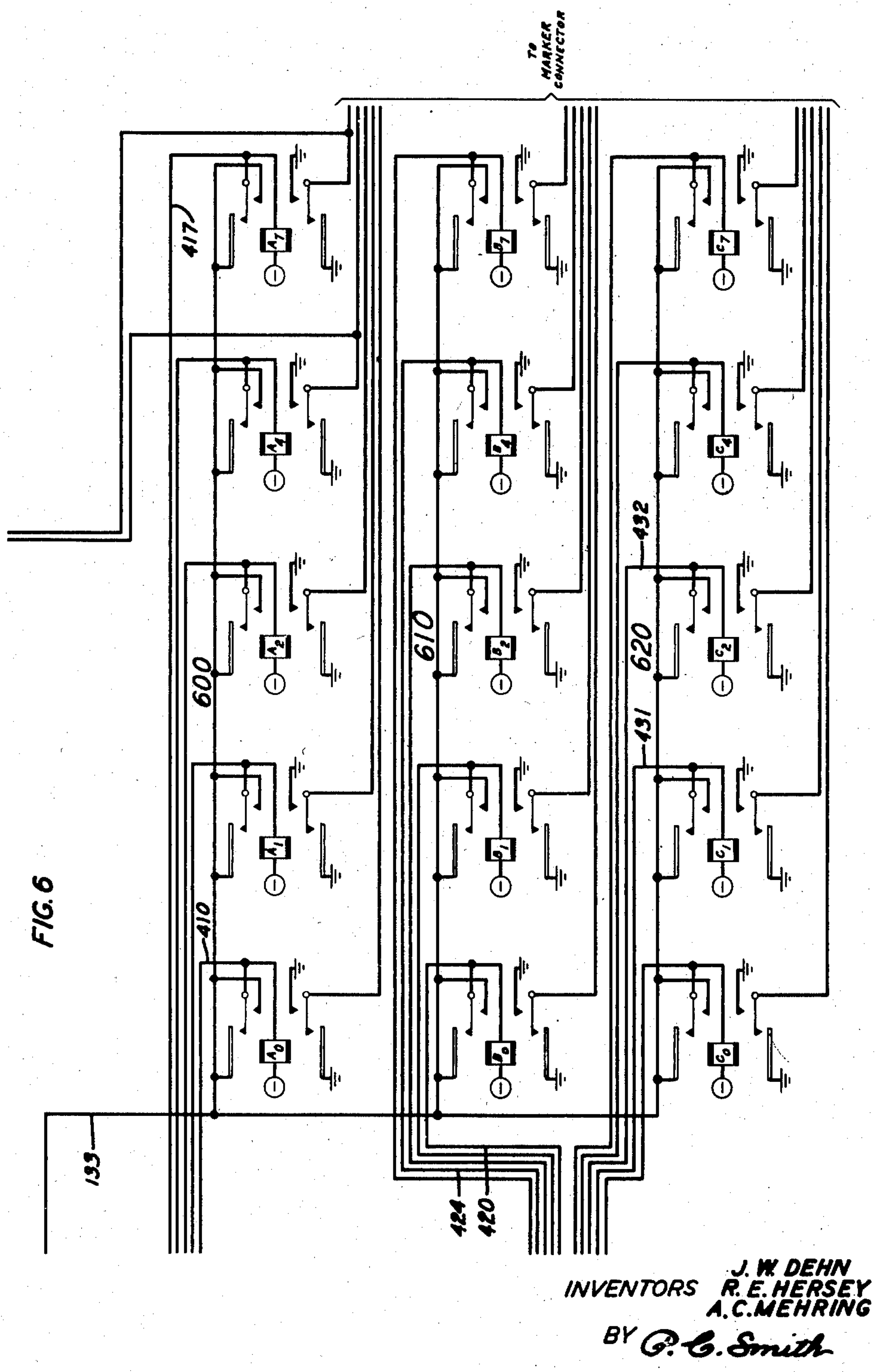
Figure 7:
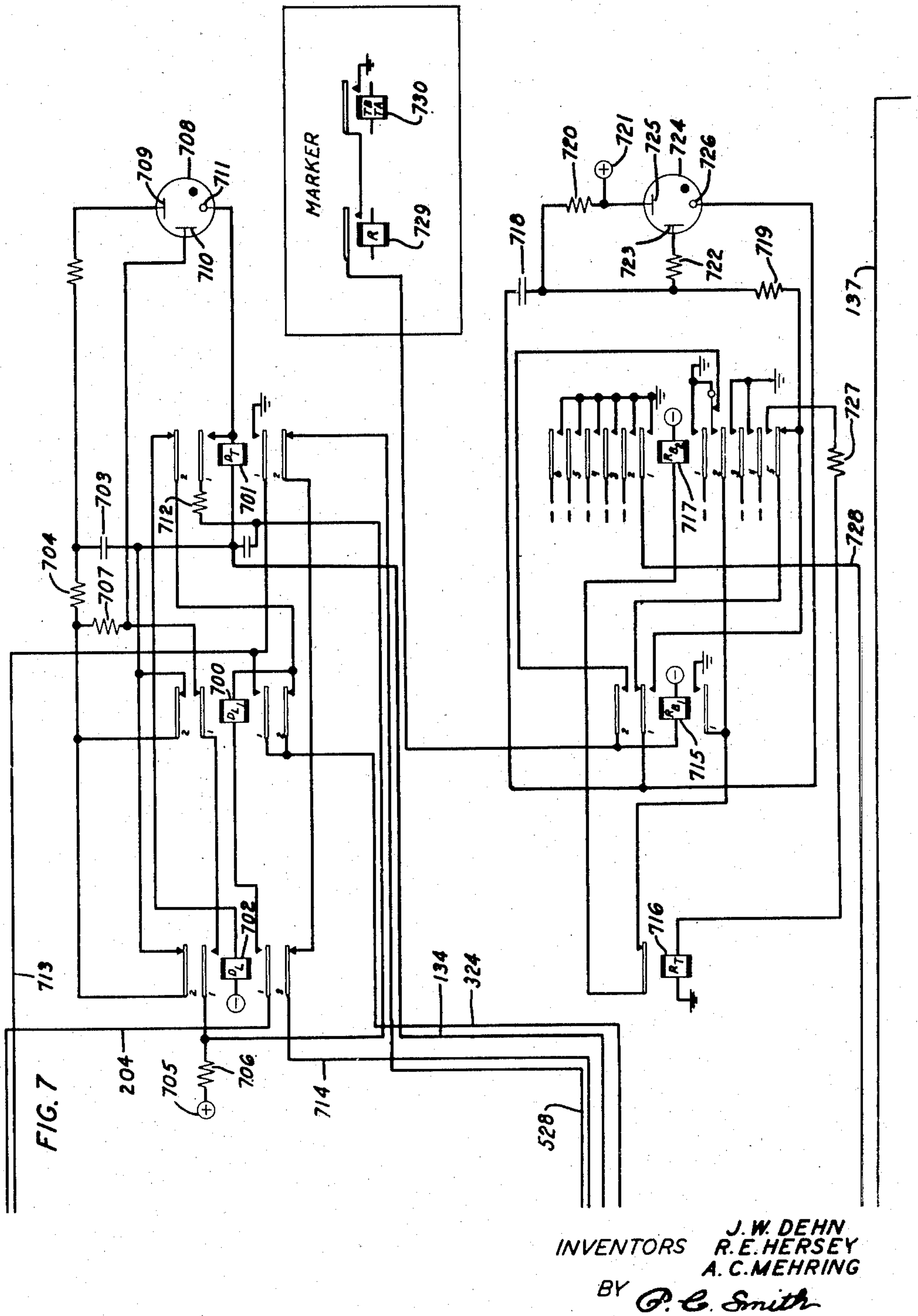

Of the figures of the drawings above-enumerated which disclose the originating register, Fig. 1 shows a portion of the register control relays and related circuits, Figs. 2, 4, and 6 show the dial pulse registers and steering relays therefor, Fig. 3 shows the dial pulse counting relays and circuits, Fig. 5 shows the register timing and marker selection circuits and Fig. 7 shows in the upper portion thereof the digit timing circuit.

The invention having been set forth in a general manner, will now be considered in detail with reference to the drawings. It will be assumed that in the manner fully set forth in the application of A. J. Busch, hereinbefore referred to, a marker taken into use by the initiation of a call by a calling subscriber has tested to find an idle originating register and has determined that the register disclosed in part herein is idle as will be indicated by the unoperated condition of the ON relay 100. Therefore, battery at the marker through the winding of a trunk test relay will be applied through the trunk-line connector, over which the marker has access to the originating register, to conductor 101 and ground will be applied through the connector to conductor 102 thereby completing a circuit from battery on conductor 101, through the winding of the F relay 103, over the upper No. 1 back contact of the ON relay 100, conductor 104, the upper No. 3 back contact of the PD relay 500, the upper No. 4 back contact of the TM1 relay 501, conductor 105, the lower No. 1 back contact of the MB relay 106 and over conductor 102 to ground at the marker. Relay 103 thereupon operates and locks over its upper No. 2 contacts to ground on conductor 102 so that the continued operation of such relay is dependent entirely upon the marker. Relay 103 also establishes a circuit from ground at the marker, over conductor 107 and its lower No. 1 contacts, through the winding of the S1 relay 108 to battery. Relay 108 thereupon operates and over its lower No. 1 contacts establishes an obvious circuit for the ON relay 100.

The S1 relay 108 at its upper No. 2 contacts and the ON relay 100 at its upper No. 3 contacts, connects ground to the off normal ground conductor 109 thereby establishing a circuit through the lower biasing winding of the L relay 110 and through resistor 111 to battery whereby the armature of this polarized relay is biased against its back or left contact. The connection of ground to conductor 109 is also effective to establish a circuit over the upper No. 2 back contact of the RA relay 300 and through the winding of the RA1 relay 301 to battery whereupon relay 301 operates. The ON relay 100 also connects ground over its upper No. 2 contacts and conductor 112 to the armature of the L relay 110 but with such armature biased against its left or back contact, the connection of such ground cannot be effective to establish the operating circuit through the winding of the LA relay 302 and the winding of the SR relay 113, which if operated might produce a false pulse.

The ON relay 100 at its upper No. 1 back contact opens the initial operating circuit for the F relay 103 but as previously stated relay 103 upon operating has locked itself under the control of the marker.

The ON relay 100 upon operating also initiates the operation of the register timing circuit of Fig. 5 by connecting ground over its lower No. 2 contacts to conductor 114 thereby establishing a circuit over the upper back contact of the TMB relay 502 and through the upper winding of the TMA relay 503 to battery. Relay 503 thereupon operates and establishes a locking circuit for itself from battery through its lower winding and inner lower contacts and an operating circuit from battery through the winding of relay 502, over its lower contacts, conductor 504, the lower No. 2 contacts of the RA1 relay 301, conductor 303, the lower back contact of the MST relay 505 and to ground over conductor 114 or in parallel from its lower No. 1 contacts over the upper No. 2 back contact of the PD relay 500, the lower back contact of the MST relay 505 and to ground on conductor 114. Relay 503 thereupon operates and at its upper back contact opens the initial operating circuit of relay 503. Relay 503 upon operating opens at its upper back contact a discharge path for condenser 506 through resistor 507 and at its upper front contact establishes a charging path for condenser 506 extending from the source 508 of positive potential, through resistor 509, over the back contact of the OVL relay 510, through resistor 507, condenser 506, over the upper front contact of relay 503 and to ground through the winding of the TM relay 511. The condenser 506 charges in this circuit but relay 511 does not operate. The condenser charges at a rate determined by the values of resistors 507 and 509 until it becomes charged, at which time the positive potential applied from source 508 through resistors 509, 507, and 512 to the control cathode 513 of tube 514 will reach such a value that the tube will break down across its control gap between cathodes 513 and 516, whereupon the TM relay 511 will operate in a path from the source 508, across the main gap of the tube between cathode 515 and the anode 516, over the upper front contact of relay 503 and to ground through the winding of relay 511. Relay 511 is thus operated a time interval following the operation of relay 503 for a purpose to be later described unless the holding circuit for relay 503 is opened before the completion of the timing cycle. If the circuit of relay 503 is thus opened and relay 503 releases, it opens the charging path of condenser 506 at its upper front contact and at its upper back contact closes the discharge path for the condenser. Relay 502 which starts its release at the time the locking circuit of relay 503 is opened, is made sufficiently slow to release so that it will not reclose the initial operating circuit of relay 503 until the condenser 506 has become substantially discharged.

The marker following its seizure by the calling line secures the location of the calling line on the line-link frame and the class of the calling line and in accordance with the information received with respect to the calling line location, proceeds to establish a connection between the selected register and the calling line over switches of the trunk-link frame and switches of the line-link frame on which the calling line terminates. The marker also proceeds to transmit the class information to the register.

The marker after transmitting the necessary information to the register, releases the F relay 103 whereupon the register is disconnected from the common leads of the trunk-link and connector circuits so that the leads may be used for other calls and the trunk-link frame relay (not shown) which has been operated from ground over the upper No. 1 contacts of the F relay 103 transfers the tip, ring and sleeve conductors of the dial tone connection to the corresponding conductors 115, 116, and 117 of the register. The ON relay 100 being operated connects ground over its upper No. 5 contacts and the lower No. 2 back contact of the RL relay 118, through the low resistance 119 to the sleeve conductor 117 thereby holding the dial tone connection.

A circuit is now effective for operating the L relay 110 which may be traced from battery over the upper normal contacts of jack 120, through the middle winding of relay 110, over the middle normal contacts of jack 120, through the upper left winding of the dial tone coil 121, the lower No. 1 back contact of the RL relay 118, over the ring conductor 116, thence over the calling line loop and returning over the tip conductor 115, the upper No. 3 back contact of relay 118 and to ground through the lower left winding of dial tone coil 121.

The current flowing through the middle winding of relay 110 now overcomes the effect of current flowing through the lower biasing winding and relay 110 operates its armature into engagement with its right or front contact and, with ground connected to its armature as previously described, completes a circuit extending over conductor 122, through the winding of the LA relay 302, conductor 123, and through the winding of the SR relay 113 to battery. Relay 113 operates and establishes a circuit from ground over its inner upper contacts and through the winding of the ON1 relay 124 to battery, whereupon relay 124 operates, locks over its upper No. 1 contacts to ground over the upper No. 2 back contact of the RL relay 118, supplies off-normal grounds for the register and over its lower No. 1 contacts establishes a holding circuit for the ON relay 100. The S1 relay 108 which started to release following the release of the F relay 103, being slow to release does not release to open the circuit of the ON relay 100 before the ON1 relay 124 has operated to prepare the holding circuit for relay 100.

Relay 124 upon operating establishes a circuit from ground over its lower No. 4 contacts, conductor 125, the upper No. 3 back contact of the P2A relay 304, conductor 319 and through the winding of the AS steering relay 400 to battery, whereupon relay 400, which is the first of a group of seven steering relays which function to control the successive operation of the group of register relays shown in Figs. 2, 4, and 6, becomes operated. Relay 400 upon operating locks in a circuit over its lower No. 1 contacts, the lower No. 1 back contact of the BS relay 401 and off-normal ground conductor 126, to which ground has been applied over the upper No. 4 contacts of the ON relay 100.

The SR relay 113 upon operating is also effective to connect dial tone supply over the upper No. 1 contacts of the P2A relay 304, conductor 127, the upper contacts of relay 113, the upper No. 1 back contact of the MAN relay 128, conductor 129, the lower back contact of the BT relay 517, conductor 130, condenser 131, and through the right winding of the dial tone coil 121 to ground whereupon a dialing tone signal is transmitted to the calling line. The subscriber hearing this tone commences to dial the digits of the number of the desired connection.

It will first be assumed that the subscriber desires a connection with a line whose directory number is SH-3156 and dials the first code letter S which has a numerical equivalent 7. On the first opening of the line loop, the L relay 110 releases thereby opening the circuit previously traced through the windings of the LA relay 302 and the SR relay 113. The SR relay 113 is slow in releasing and holds operated during the momentary openings of the right contacts of relay 110 but relay 302 follows relay 110 releasing when relay 110 releases and reoperating when relay 110 reoperates. The LB relay 305 in turn follows the LA relay 302, its operating circuit extending from battery through its winding, over the front contact of relay 302, conductor 320, the upper No. 6 contacts of the ON1 relay 124 and to ground over the upper No. 2 contacts of the ON relay 100. When the first dial pulse occurs and the LA relay 302 releases, a circuit is established from battery through the lower winding of the RA relay 300 and the back contact of relay 302 to ground on conductor 320 and relay 300 operates and being slow to release, because of its upper short circuited winding, remains operated during the train of pulses but will release when relays 110 and 302 remain operated at the end of the train of pulses. When relay 300 operates, it supplies holding ground from conductor 320, over its lower No. 2 contacts for the LC relay 306, LD relay 307 and LE relay 308. Due to the fact that the RA relay 300 is somewhat slow in operating as well as in releasing, the LB relay 305 is arranged to close this holding circuit over its back contacts until the RA relay 300 has had time to operate.

The RA1 relay 301 which operated as soon as the register was seized by a marker, provides temporary holding circuits for the P1 to P6 relays 311 to 316 inclusive. When the RA relay 300 operates, relay 301 releases partly closing the operating circuits of the even P2, P4 and P6 relays and closing the locking circuit for all relays P1 to P6 inclusive. With relay 300 operated and relay 301 released, the register is ready to count dial pulses. On each closure of the left or back contact of the L relay 110, a circuit is established from ground on conductor 112, over such contacts, the inner lower contacts of the SR relay 113, conductor 132, the upper back contact of the MST1 relay 518, conductor 519 and to the contacts of the LE relay 308. The first release of the L relay 110 in response to the first impulse, therefore completes a circuit over the upper back contact of the LE relay 308, and through the winding of the LC relay 306 to battery. Relay 306 thereupon operates and locks in a circuit through the lower winding of the LE relay 308, the back contact of the LD relay 307, the upper contact of relay 306, conductor 317, the lower No. 2 contacts of relay 300 and to ground on conductor 320. Relay 308 does not, however, operate in this locking circuit because until relay 110 reoperates its lower winding is shunted. When, however, relay 110 reoperates, relay 308 operates. On the next release of relay 110 in response to a second dial pulse, ground is again applied to conductor 519 and a circuit is completed over the inner upper contacts and through the upper winding of LE relay 308 and to battery through the upper winding of the LD relay 307. Thereupon relay 307 operates and relay 308 is held operated. Relay 307 upon operating opens the holding circuit of the LC relay 306 extending as traced through the lower winding of relay 308 and relay 306 thereupon releases but relay 308 remains operated over its upper winding in the operating circuit of relay 307. When the L relay 110 reoperates, the circuit traced through the upper winding of relay 308 and the upper winding of relay 307 is opened and relay 308 releases but relay 307 is maintained operated over a locking circuit which extends from battery through its lower winding and lower contacts to the lower contacts of the LC relay 306 so that relay 307 will keep the circuit over its upper contacts to the lower winding of relay 308 open until it has released. On the next or third impulse the release of the L relay 110, ground applied to conductor 519 is effective to again operate the LC relay 306 and the cycle will be repeated. Pulses 1, 3, 5, 7, and 9 will thus cause the LE relay 308 to operate and pulses 2, 4, 6, 8, and 10 will cause relay 308 to release.

The first time that the LE relay 308 operates, it establishes a circuit from ground applied from conductor 320, over the lower contacts of the RA relay 300 to conductor 317, thence over the lower contacts of relay 308 to conductor 309, thence over the lower back contact of the P4 relay 314, the lower back contact of the P2 relay 312, the upper No. 2 back contact of the P3 relay 313, the upper back contact of the P5 relay 315 and through the lower winding of the P1 relay 311 to battery. Relay 311 thereupon operates and locks in a circuit from battery through its upper winding and upper No. 1 contacts, the inner upper normal contacts of the P2 relay 312, the inner lower normal contacts of the P3 relay 313, the inner upper normal contacts of the P4 relay 314, the inner lower normal contacts of the P5 relay 315, conductor 310 and the upper No. 1 back contact of the RA1 relay 301 to ground on conductor 320.

When the LE relay 308 releases in response to the second pulse, ground is connected from conductor 317, over its inner lower back contact and the lower No. 1 back contact of the RA1 relay 301 to conductor 318 and, with the P1 relay 311 operated, a circuit is completed over the lower No. 2 contacts of relay 311 and through the winding of the P2 relay 312 to battery and in parallel over the lower No. 1 normal contacts and through the winding of the P2A relay 304 to battery. Relay 312 thereupon operates and locks over its inner upper alternate contacts and as previously traced over the locking circuit to ground on conductor 310 and at its inner upper normal contacts opens the locking circuit of the P1 relay 311 which thereupon releases. Relay 304 also operates and locks over its lower No. 1 alternate contacts to ground on conductor 112.

When the LE relay 308 again operates in response to the third pulse and connects ground to conductor 309, a circuit is completed over the lower back contact of the P4 relay 314, over the lower front contact of the P2 relay 312 and through the winding of the P3 relay 313 to battery. Relay 313 thereupon operates and locks over its inner lower alternate contacts and the locking circuit previously traced to ground on conductor 310 and at its inner lower normal contacts opens the locking circuit of the P2 relay 312 which now releases.

On the fourth pulse when the LE relay 308 again releases and applies ground to conductor 318, a circuit is established over the lower contacts of the operated P3 relay 313 and through the winding of the P4 relay 314 to battery and relay 314 operates and locks over its inner upper alternate contacts and over the locking circuit previously traced to ground on conductor 310 and at its inner upper normal contacts opens the locking circuit for the P3 relay 313 which now releases.

On the fifth pulse when the LE relay 308 again operates and applies ground to conductor 309, a circuit is established over the lower front contact of relay 314 and to battery through the winding of the P5 relay 315 and the latter relay thereupon operates, locks over its inner lower alternate contacts to ground on conductor 310 and at its inner lower normal contacts opens the locking circuit of the P4 relay 314 which now releases.

On the sixth pulse when LE relay 308 again releases and connects ground to conductor 318, a circuit is completed over the lower contacts of relay 315 and through the lower winding of the P6 relay 316 to battery and the latter relay now operates and locks through its upper winding and over its inner upper contacts to ground on conductor 310 and over its inner lower contacts establishes an obvious circuit through the winding of the P6A relay 321 to battery and the latter relay then operates. It is to be noted that the operation of the P6 relay 316 has not caused the release of the P5 relay 315.

On the seventh pulse when the LE relay 308 again operates and connects ground to conductor 309, a circuit is established over the lower back contact of the P4 relay 314, the lower back contact of the P2 relay 312, the upper No. 2 back contact of the P3 relay 313, the upper No. 3 contacts of the P6 relay 316 and to battery through the lower winding of the P1 relay 311. Relay 311 thereupon operates, locks through its upper winding and over its No. 1 contacts, the inner upper normal contacts of the P2 relay 312, the inner lower normal contacts of the P3 relay 313, the upper No. 3 contacts of the P1 relay 311, the upper No. 2 contacts of the P6 relay 316 to ground on conductor 310 and at its lower back contact opens the circuit of the P5 relay 315 which now releases.

Should there be an eighth pulse, then when the LE relay 308 again releases and connects ground to conductor 318, a circuit is established over the lower No. 2 contacts of the P1 relay 311 through the winding of the P2 relay 312 to battery and relay 312 operates, locking over its inner upper alternate contacts and the locking circuit just traced to ground on conductor 310 and at its inner upper normal contacts opens the locking circuit of relay 311 which now releases.

Should there be a ninth pulse, then when relay 308 again operates and connects ground to conductor 309, a circuit is established over the lower back contact of the P4 relay 314, the lower front contact of the P2 relay 312 and to battery through the winding of the P3 relay 313 whereupon relay 313 operates, locks over its inner lower alternate contacts and thence as previously traced to ground on conductor 310 and at its inner lower normal contacts opens the locking circuit of the P2 relay 312 which now releases.

Should there be a tenth pulse, then when the LE relay 308 again releases it will connect ground to conductor 318 and establish a circuit over the lower contacts of the P3 relay 313 and through the winding of the P4 relay 314 to battery and relay 314 will operate, lock over its inner upper alternate contacts and the inner lower normal contacts of the P5 relay 315 to ground on conductor 310 and open at its inner upper normal contacts the locking circuit of the P3 relay 313 which will then release. The following table shows the relays operated after any pulse:

| Pulse No. | Relays Operated | Register Leads Grounded |
|---|---|---|
| 1 | LC, LE, P1 | 0, 1 |
| 2 | P2 | 0, 2 |
| 3 | LC, LE, P3 | 1, 2 |
| 4 | P4 | 0, 4 |
| 5 | LC, LE, P5 | 1, 4 |
| 6 | P5, P6, P6A | 2, 4 |
| 7 | LC, LE, P1, P6 | 0, 7 |
| 8 | P6A, P2, P6, P6A | 1, 7 |
| 9 | LC, LE, P3, P6 | 2, 7 |
| 10 | P6A, P4, P6, P6A | 4, 7 |

The pulse counting will of course stop when the dial reaches its normal position so that any P relay or relays may remain operated as shown in the preceding table.

When a train of pulses for a digit ends, the L relay 110 and LA relay 302 remain operated and the RA relay 300 releases thereby causing the reoperation of the RA1 relay 301. Relay 300 at its lower No. 1 and upper No. 1 back contacts now closes paths through the contacts of the P1 to P5 and P6A relays to two of leads 0, 1, 2, 4, and 7 according to the pattern in the preceding table. The operation of the RA1 relay 301 at its upper No. 1 back contact removes ground from conductor 310 thereby releasing any operated P relays and thereby removing ground from the two selected leads. During the operate time of relay 301 and the release time of the P relays, a pair of the register relays of Figs. 2, 4 or 6 will be operated corresponding to the digit being registered. The leads 0, 1, 2, 4, and 7 will be extended to the groups of five relays of the registers in sequence as will now be described.

When the P2A relay 304 operated as previously described in response to the second dial pulse, it opened at its upper No. 1 back contact the previously traced circuit through the right winding of the dial tone coil 121 to stop the transmission of dial tone; opened at its upper No. 3 back contact the initial operating circuit of the AS relay 400 and established the circuit of the EV relay 403 which may be traced from battery through the winding of such relay, over the lower No. 1 back contact of the OD relay 404, the lower No. 4 contacts of the AS relay 400, conductor 405 and to ground over the upper No. 2 contacts of relay 304. Relay 403 upon operating, connects the 0, 1, 2, 4, and 7 digit leads over its upper contacts, the upper contacts of operated AS steering relay 400 and other conductors to the windings of the relays A0, A1, A2, A4, and A7 of the A digit register 600 shown in Fig. 6. Since the five leads cannot be extended to the relays of the A digit register 600 until relay 403 operates, following the transmission of two pulses, a single pulse digit or series of single pulse digits will not affect the A digit register and a wrong number will not be registered if the calling subscriber accidentally generated a single pulse by opening the switchhook contacts before dialing.

It has been assumed that the calling subscriber has operated his dial to transmit seven pulses for the first code letter S. Consequently at the end of the series of seven pulses, the P1, P6 and P6A pulse counting relays 311, 316 and 321 are operated and upon the release of the RA relay 300 at the end of the pulse series, ground is applied from conductor 109 over the lower No. 1 back contact of relay 300, the lower No. 1 contacts of the P1 relay 311, the 0 lead, the upper No. 1 contacts of the EV relay 403, the upper No. 1 contacts of the AS relay 400, conductor 410 and through the winding of the A0 relay of the A digit register 600 to battery, and ground is applied from conductor 109 over the upper No. 1 back contact of relay 300, the upper No. 2 contacts of the P1 relay 311, the lower No. 2 front contact of the P6A relay 321, lead 7, the upper No. 5 contacts of the EV relay 403, the upper No. 5 contacts of the AS relay 400, conductor 417 and through the winding of the A7 relay of the register 600 to battery. Thus relays A0 and A7 of the register 600 have been operated to register the first code letter S. Upon operating, these relays lock over their upper contacts to off normal ground conductor 133 to which ground was applied over the upper No. 5 contacts of ON1 relay 124.

When the RA1 relay 301 operates at the end of the pulse series, ground is removed at its upper No. 1 back contact from conductor 310 thereby releasing the operated P relays, in the case assumed the P1, P6 and P6A relays 311, 316 and 321. Relay 301 connects ground from conductor 126, over its upper No. 2 contacts, conductor 322, the lower No. 4 contacts of the EV relay 403, the lower No. 3 contacts and through the winding of the AS relay 400 to battery for holding the relay 400 operated after the BS relay 401 operates and until the commencement of the counting of the next digit series, and applies ground from conductor 126 over its upper No. 3 contacts, conductor 323, the lower No. 2 contacts of the EV relay 403 and the lower No. 2 contacts of the AS relay 400 through the winding of the BS relay 401 to battery. Relay 401 thereupon operates and locks over its lower No. 2 contacts and the lower No. 1 back contact of the CS relay 402 to ground on conductor 126 preparatory to registering the second dialed digit. When the second digit is dialed the RA1 relay 301 releases at the beginning of the second digit series and opens the locking circuit for the AS relay 400 and the initial energizing circuit for the BS relay 401. Relay 400 upon releasing opens the circuit of the EV relay 403 which now releases and with the BS relay 401 now locked operated, a circuit is established from battery through the winding of the OD relay 404, the lower No. 1 back contact of relay 403 and the ground over the lower No. 4 contacts of relay 401.

It has been assumed that the calling subscriber dials a second code letter H which has the numerical value 4 and that consequently the P4 counting relay 314 is operated and locked at the end of the pulse series. At the end of the pulse series the RA relay 300 releases and connects ground from conductor 109, over its lower No. 1 back contact, the inner lower front contact of the P4 relay 314, the lower No. 1 back contact of the P6A relay 321, lead 0, the upper No. 1 contacts of the OD relay 404, the upper No. 1 contacts of the BS relay 401, conductor 420 and through the winding of the B0 relay of the B digit register 610 to battery, and connects ground from conductor 109, over its upper No. 1 back contact, the upper contacts of the P4 relay 314, lead 4, the upper No. 4 contacts of the OD relay 404, the upper No. 4 contacts of the BS relay 401, conductor 424, and through the winding of the B4 relay of the B digit register 610. Thus relays B0 and B4 of the register 610 have been operated to register the second code letter H. Upon operating, these relays lock over their upper contacts to off-normal ground conductor 133.

When the RA1 relay 301 operates at the end of the pulse series, ground is removed at its upper No. 1 back contact from conductor 310 thereby releasing the operated P4 relay 314. Relay 301 also connects ground to conductor 322 thereby establishing a circuit over the lower No. 4 contacts of the OD relay 404 and the lower No. 5 contacts of the BS relay 401 to hold relay 401 operated when its initial holding circuit is opened by the operation of the CS relay 402, and ground applied to conductor 323 establishes a circuit over the lower No. 2 contacts of relay 404, the lower No. 3 contacts of the BS relay 401 and through the winding of the CS relay 402 to battery whereupon relay 402 operates and locks over its lower No. 2 contacts, conductor 406 and the lower No. 1 back contact of the DS relay 200 to ground on conductor 126 preparatory to registering a third dialed digit. When the third digit is dialed, the RA1 relay 301 releases at the beginning of the third digit series and opens the locking circuit for the BS relay 401 and the initial energizing circuit for the CS relay 402. Relay 401 upon releasing opens the circuit of the OD relay 403 which now releases and with the CS relay 402 now locked operated a circuit is established from battery through the winding of the EV relay 403, the lower No. 1 back contact of relay 404 and to ground over the lower No. 4 contacts of the CS relay 402.

It has been assumed that the calling subscriber dials a third digit 3 and that consequently the P3 counting relay 313 is operated and locked at the end of the pulse series. At the end of the third digit series, the RA relay 300 releases and connects ground from conductor 109, over its lower No. 1 back contact the inner upper contacts of relay 313, the lower back contact of the P6A relay 321, lead 1, the upper No. 2 contacts of the EV relay 403, the upper No. 2 contacts of the CS relay 402, conductor 431 and through the winding of the C1 relay of the C digit register 620 to battery, and from conductor 109 over the upper No. 1 back contact of relay 300, the upper No. 3 contacts of the P3 relay 313, lead 2, the upper No. 3 contacts of the EV relay 403, the upper No. 3 contacts of the CS relay 402, conductor 432 and through the winding of the C2 relay of the C digit register 620 to battery. Thus relays C1 and C2 of the C digit register 620 have been operated to register the third digit 3. Upon operating, these relays lock over their upper contacts to off normal ground conductor 133.

The progression above-described for controlling the registration of the first three dialed digits continues and it will be noted that with the BS, DS, and FS relays 401, 200 and 202 operated together with the OD relay 404, the leads 0, 1, 2, 4, and 7 are extended to the B, D or F digit registers 610, 450, and 250, respectively, and that with the AS, CS, ES and GS relays 400, 402, 201 or 203 operated together with the EV relay 403, the leads 0, 1, 2, 4, and 7 are extended to the A, C, E, and G digit registers 620, 460 or 260, respectively. Under the assumption made, relays D0 and D1 of the D digit register 450 are operated to register the fourth dialed digit 1, relays E1 and E4 of register 460 are operated to register the fifth dialed digit 5 and relays F2 and F4 of the F register 250 are operated to register the sixth dialed digit 6. These registrations are made in the manner previously described.

On the call previously assumed the register does not know if a seventh digit is to be dialed, as for example, on a call involving a stations digit, and therefore it must wait for such a possible digit before calling in a marker to complete the connection. For this purpose the DL punching at the left of Fig. 2 is cross-connected to the F punching. When therefore the GS relay 203 operates at the end of dialing the sixth digit preparatory to controlling the registration of a possible seventh digit, a circuit is established from ground over the upper No. 6 contacts of relay 203, strapped punchings F and DL, conductor 204, the lower No. 3 contacts of the RA1 relay 301, conductor 324, the lower back contact of the DL1 relay 700, the upper back contact of the DT relay 701 and through the winding of the DL relay 702 to battery. As soon as the RA1 relay 301 reoperates at the end of the sixth digit series, relay 702 will operate.

Relay 702 upon operating opens the discharge path for condenser 703, extending through resistor 704 and over the upper back contact of relay 702 and establishes a charging path for condenser 703 which may be traced from battery 705 through resistor 706, the upper front contact of relay 702, the upper back contact of the DL1 relay 700 through resistors 707 and 704, condenser 703 and off-normal ground conductor 134 connected to ground over the lower No. 2 contacts of the ON1 relay 124. Relay 702 also establishes a holding circuit for itself extending from battery through its winding, the upper back contact of the DT relay 701, through the winding of the DL1 relay 700, the inner lower contacts of relay 702 and to ground on conductor 204, but the winding of relay 700 being shunted over its lower back contact to ground applied to conductor 324 so long as the RA1 relay 301 remains operated, does not operate in this locking circuit. If the RA1 relay 301 remains operated for three to five seconds indicative of the fact that the subscriber has not dialed another digit, the voltage across condenser 703 will reach a high enough value to cause the tube 708 to break down across its control gap between the cathodes 709 and 711 and to thereby establish a circuit for the DT relay 701 from the positive potential source 705, through resistor 706, over the inner upper contacts of relay 702, the inner upper back contact of relay 700, across the main gap of tube 708 between the anode 710 and the cathode 711 and through the winding of the DT relay 701 to ground on conductor 134, whereupon relay 701 operates and locks over its upper contacts and through resistors 712 and 706 to the source of positive potential 705.

Relay 701 upon operating opens the initial operating and the locking circuits of relay 702 which relay then releases to deionize the tube 708 and to transfer the condenser 703 from its charging to its discharging path. Relay 701 also establishes a circuit from ground, over its inner lower contacts, conductor 713, the inner lower contacts of the TMB relay 502 and through the winding of the MST relay 505 to battery. Relay 505 thereupon operates, establishes a circuit from ground over its upper No. 4 contacts, the lower back contact of the MRL relay 520, the upper No. 2 back contact of the BT relay 517 and conductor 521 to start the timer of the marker connector (not shown); connects battery over its lower No. 2 contacts and conductor 522 for supplying battery to the marker connector for the operation of the register connector relays of the connector and establishes a start circuit from battery over its lower No. 1 contacts, the upper back contact of the MRL relay 520, the upper No. 3 back contact of the BT relay 517 and start conductor 523 to operate a register sequence relay in the connector.

The result of this is that an idle marker becomes connected to the originating register over the marker connector and a plurality of control leads are extended from the marker to the register.

Relay 505 at its lower No. 3 contact shunts the inner lower contacts of the TMB relay 502 so that the holding circuit of relay 505 will be independent of relay 502 and at its lower No. 4 back contact opens the locking circuit of TMA relay 503 and the operating circuit of the TMB relay 502 whereupon such relays release to open the charging circuit of condenser 506 associated with the register timing tube 514 and to close the discharge path for the condenser to thereby recycle the timer which has up to this time been functioning for partial dial timing. In addition, relay 505 also establishes a circuit from battery through the winding of the MST1 relay 518, the upper No. 2 contacts of relay 505, the upper back contact of the TM relay 511 and to ground over conductor 114 and relay 518 thereupon operates and locks over its upper No. 1 contacts to ground on conductor 114. Relay 518 provides a holding circuit for the RA1 relay 301 extending over conductor 325, the lower No. 1 contacts of relay 518 and to ground on conductor 109 so that the digit steering circuits of Fig. 4 will not advance further; at its upper No. 4 back contact opens the pulse lead 519 whereby further pulsing will be ineffective; and establishes a circuit from ground over the upper No. 3 contacts of the ON1 relay 124, conductor 135, the lower No. 2 contacts of relay 518, conductor 533, the lower No. 3 contacts of the OD relay 404, conductor 407, the upper No. 1 contacts of the GS relay 203 and through the winding of the G7 relay of the G digit register 260 to battery.

The operated G7 relay connects ground to conductor 205 extending over the marker-connector to the marker to inform the marker that the last digit dialed was registered on the F digit register 250. The operated relays of the A, B, C, D, E, and F registers are also effective to connect ground over their lower contacts to other conductors extending over the marker-connector to the marker to inform the marker of the values of the dialed digits. Other information required by the marker and registered in the originating register is also transmitted at this time to the marker.

If the subscriber does dial a digit before the timing interval is completed, the RA1 relay 301 releases, removing ground from conductor 324 thereby removing the shunt from the DL1 relay 700 which operates in the locking circuit of the DL relay 702 and terminates timing by removing the positive source of potential 705 from connection with the condenser 703 and opens the circuit from its winding to conductor 324 so that it will not be shunted down when the RA1 relay 301 reoperates. Relay 700 also connects ground from conductor 204, over the lower contacts of the RA1 relay 301, conductor 324 and the inner lower contacts of relay 700 to conductor 713 to thereby render effective the circuit for operating the MST relay 505 to summon a marker to complete the desired connection when the RA1 relay 301 reoperates at the end of the seventh digit. The additional dialed digit will be registered on the relays of the G digit register 260 in a manner similar to that discussed with respect to the registration of the previously dialed digits.

When the marker has received all of the information from the register for establishing the desired connection and has completed its other functions, then it is ready to establish the connection and informs the register of such fact by connecting ground to conductor 525 extending over the marker-connector to the originating register thereby causing the operation of the RL relay 118. Relay 118 upon operating locks over its upper No. 1 contacts to ground over the upper No. 6 contacts of the ON relay 100; at its upper No. 3 and lower No. 1 back contacts opens the tip and ring conductors of the dialing connection to the calling line so that the inductive load included in the dialing connection will not be broken at the cross-point contacts of the switches; and opens the sleeve connection to release the dial tone connection. The L relay 110 now releases but the SR relay 113 and the LA relay 302 are held operated over a circuit which may be traced from battery through their windings, over conductor 326, the upper No. 5 contacts of the MST relay 505, conductor 526, extending to the marker connector, thence returning over conductor 521, the upper No. 2 back contact of the BT relay 517, the lower back contact of the MRL relay 520 and to ground over the upper No. 4 contacts of the MST relay 505.

After completing the originating connection to the calling line, the marker connects ground to lead 527 thereby causing the operation of the MRL relay 520. Relay 520 upon operating locks over its inner upper contacts to ground over the upper No. 3 contacts of the MST relay 505, opens the start lead 523 to initiate the release of the marker-connector and removes ground from conductor 521 to stop the marker-connector timer. The removal of ground from conductor 526 upon release of the marker-connector releases the SR relay 113 and the LA relay 302. Relay 113 upon releasing permits the release of the ON1 relay 124 followed by the release of the ON relay 100 which latter relays remove ground from the off-normal ground conductors of the register thereby releasing all operated relays of the register.

*Register time out*

As previously stated, the register timing circuit of Fig. 5 measures times for the important functions of the register to be completed. If a function is completed in the time allowed, the timer resets itself and measures time for the next function. If the function is not completed in the time allowed, the timer times out and causes the register to take the appropriate action. If the timer times out awaiting the dialing of a first digit it engages a marker and requests a connection to a permanent signal trunk. If it times out awaiting the dialing of other digits, it engages a marker and requests a connection to a partial dial trunk.

The time out intervals are normally from 20 to 25 seconds but when the load on the office is heavy the timer interval may be reduced to 10 to 17 seconds while awaiting the dialing of the first digit and to 5 to 8 seconds while awaiting the dialing of other digits to thereby reduce the register holding time.

The timer is started to function as previously described upon the operation of the ON relay 100 immediately after the seizure of the register. As explained previously the P2A relay 304 operates on the second pulse of the first dialed digit. When this relay operates a circuit is established from battery through the winding of the PD relay 500, over the upper No. 2 back contact of the MST1 relay 518, conductor 528, the lower back contact of the DT relay 701, the lower back contact of the DL relay 702, conductor 714 and to ground over the lower No. 3 contacts of the P2A relay 304. The operation of relay 500 is indicative that the subscriber has started dialing. From the time the register is selected until the PD relay 500 operates, the timer measures time. If relay 500 operates before the end of the allotted time interval, it removes a short circuit at its upper No. 2 back contact extending over conductors 303 and 504 from the lower No. 2 contacts of the RA1 relay 301 which allows the latter relay to control the timer start conductor 504 until the end of dialing. At this time, relay 301 is unoperated since the pulses for the first digit are being counted so that ground is removed from conductor 504 and the TMA and TMB relays 503 and 502 are released to restart the timer.

If, however, the PD relay 500 does not operate during the allotted time, the TM relay 511 will operate as previously described in turn causing the operation of the TM1 relay 501. Relay 501 upon operating locks over its upper No. 2 contacts and over the upper No. 4 back contact of the PD relay 500 to ground on conductor 114 and establishes a circuit from ground over its lower contacts, the lower No. 2 back contact of the PD relay 500 and to battery through the winding of the MST relay 505. Relay 505 thereupon operates and functions in the manner previously described to seize a marker. With relay 501 operated and the PD relay 500 unoperated, ground is connected over the upper No. 1 front contact of relay 501, the lower No. 1 normal contacts of relay 500 and conductor 529 extended to the marker over the marker-connector to signal the marker that a permanent signal condition has been encountered and that the marker should reroute the call to a permanent signal trunk. If the marker cannot set up the call to a permanent signal trunk, it will attempt to connect the calling line to a common overflow trunk. If the marker does not succeed in doing this, it will operate the BT relay 517 and the RL relay 118. Relay 118 upon operating releases the register and relay 517 upon operating releases the marker.

At the end of each digit series, the RA1 relay 301 operates and at its lower No. 2 contacts closes the operating circuit previously traced over which ground was connected to the timer start conductor 504 thereby causing the TMB and TMA relays 502 and 503 to operate. At the beginning of each digit, relay 301 releases to remove ground from conductor 504 to release relays 502 and 503. After the TMB relay 502 has released, the TMA relay 503 reoperates to restart the timer. Thus the timer is reset and restarted at the beginning of each digit.

If the subscriber dials too few digits, that is, dials partially or dials extremely slowly, or the subscriber's line is crossed with a power line or other source of continuous pulses, time out will occur and the TM relay 511 will operate and will cause the operation of the TM1 relay 501 which will lock over its upper No. 2 contacts to ground over the upper No. 4 front contact of the PD relay 500 which latter relay will be locked operated over its lower No. 4 contacts, the inner lower No. 1 contacts of relay 501 and to ground on conductor 714. With the TM1 relay 501 operated, a circuit is established from ground over its lower No. 3 contacts and the lower No. 2 front contact of the PD relay 500 for the MST relay 505 thereby causing the operation of the latter relay to seize a marker. Relay 501 also connects ground over its upper No. 1 front contact and the lower No. 1 alternate contacts of the PD relay 500 to conductor 530 extending over the marker-connector to signal the marker that it should proceed to connect the subscriber's line to a partial dial trunk.

If all the digits are dialed in time, the MST1 relay 518 will be operated as previously described and will open the operating circuit of the PD relay 500 which will release and shunt out at its upper No. 2 back contact, the lower No. 2 contacts of the RA1 relay 301 so that the latter relay will have no further effect on the timer. When the last digit has been dialed, the lower No. 2 contacts of relay 301 will remain closed so that the TMB relay 502 will be operated and the TMA relay 503 locked to the start conductor 504.

*Heavy traffic load*

When the traffic load on the registers becomes heavy, it is desirable to reduce some of the time out intervals in order to avoid as much as possible a shortage of registers due to subscribers dialing before dial tone and thus holding the registers for long permanent signals or partial dial time out intervals and this is accomplished under the control of a group busy circuit common to a plurality of registers.

In its normal or idle condition, when its ON1 relay 124 and MB relay 106 are both released, each register of a group establishes a circuit from ground over the upper No. 1 back contact of relay 106, the upper No. 2 back contact of relay 124, through resistor 136, conductor 137, over the upper normal contacts of jack 800, through the upper winding of polarized relay 801 and through the current-limiting ballast lamp 802 to battery. Thus a plurality of parallel circuits for energizing the upper winding of relay 801 are provided, these parallel circuits being all closed if all registers are idle. Whenever any register is made busy through the operation of its make busy relay 106 or the operation of its ON1 relay 124 when seized for service by a marker, its branch of the operating circuit for relay 801 becomes open. If it is desired that relay 801 shall not release until all of the group of registers become busy, then the R punching is not connected and the lower biasing winding of relay 801 is therefore ineffective. If, however, it is desired that relay 801 shall release when not more than 1, 2, 3, 4, 5, 6 or 7 registers are idle, the R punching is cross-connected to punchings 1, 2, 3, 4, 5, 6 or 7, respectively. Thus, for example, if traffic data is desired when, for example, three or less registers are idle and the R punching is cross-connected to the 3 punching, a current flow is established from battery through lamp 802, resistors 803 and 804, the middle normal contacts of jack 800 through the lower or biasing winding of relay 801 and to ground over the lower normal contacts of jack 800 in the release direction, of such a value as to permit relay 801 to release when three or less 3200-ohm grounds through resistors 136 are connected through the upper winding of relay 801.

When relay 801 releases it establishes a circuit from ground over its left or back contact and through the winding of the D relay 805 to battery. Other relays similar to relay 805 would be provided for other groups of registers. When any one of the D relays 805 operates, it establishes a circuit from ground over its upper No. 2 contacts to the start conductor 807, extending to the 60 I. P. M. interrupter circuit; places the H relay 808 under the control of the interrupter circuit and with the H relay 808 unoperated causes the operation of the J relay 809 over a circuit extending from battery through its winding, over the upper No. 1 contacts of relay 805 and to ground at the inner upper back contact of relay 808. Each time that ground is supplied to conductor 810 by the interrupter circuit, a circuit is completed over the upper No. 3 contacts of relay 805 and through the winding of relay 808 to battery and relay 808 operates, locks over its lower contacts to ground on conductor 810 and connects ground to the start conductor 807 of the interrupter circuit so that the completion of the cycle of operations will be insured even though all of the associated D relays, such as 805, should release. Relay 809 is slow to release and during its release time, relay 811 operates in a circuit from battery through its winding, over the contacts of relay 809 and to ground over the inner upper front contact of relay 808. Relay 811 thus operates at a rate of once per second and produces ground impulses at its contacts.

At its upper contacts, relay 811 applies ground pulses over the inner lower contact of the operated D relay 805 to the LD counter 812, allocated to the originating registers. Thus the counter of the originating register group corresponding to the operated D relay 805 is operated to record the approximate time in seconds that all the registers of the group are found busy.

Each time the counter 812 is operated, a ground pulse over one of the lower contacts of relay 811 is applied over the lower contacts of the operated D relay 805 and through the upper winding of the E relay 813, corresponding to the busy group of originating registers to battery, and such relay operates, locks over its lower winding and inner lower contacts under the control of a key at the master test frame, lights a lamp at that frame and provides a minor alarm for the aisle on which the master test frame is located. Relay 813 also connects ground over its upper contacts to conductor 814 so that if the alarm is transmitted to a distant office this alarm conductor will be a distinctive load indication rather than a minor alarm. When the A switchboard is located in the same building, relay 813 extends its operating ground over its inner upper contacts to the G relay 815 which operates and locks under the control of a key at the switchboard and supplies a signal indicating at the switchboard that the group of registers is busy.

When one of the busy registers of the group becomes idle, the circuit of the allocated D relay 805 is opened. If a waiting call immediately reseizes this one idle register in the group, the relay 805 is usually reenergized before it has time to release due to its slow releasing characteristic. When there is no call awaiting the idle register, relay 805 releases stopping further operations of the associated counter 812 at one second intervals. If there are no other D relays operated, and the 60 I. P. M. interrupter is in the nongrounded interval, the J relay 809 releases and if in the grounded interval the H relay 808 is held operated until the ground interval ends when it releases. A key (not shown) at the master test frame is operated to release the E relay 813 and a key at the A switchboard is operated to release the G relay 815.

When the marker has been seized to establish a dial tone connection a route relay therein is operated to inform the marker of that fact. Thereafter the marker looks to find an originating register but if the originating registers are all found to be busy relay TBTA in the marker is operated in the manner disclosed in the application of A. J. Busch hereinbefore referred to. With the route relay and relay TBTA operated the group busy circuit becomes operated to reduce the time-out intervals of the originating registers. For the purpose of this disclosure the route relay R and the TBTA relays of a marker have been schematically disclosed in the box in Fig. 7 labeled "Marker." With the route relay 729 and the TBTA relay 730 operated the circuit of the RB1 relay 715 is established. Thereupon relay 715 operates and establishes a circuit from ground over its lower contacts, the back contact of RT relay 716 and through the winding of RB2 relay 717 to battery. Relay 717 thereupon operates and to insure that relay 717 is operated, the RB1 relay 715 is locked over its upper contacts and the lower No. 2 normal contacts of the RB2 relay 717 until the RB2 relay 717 is operated. When the momentary application of ground to the winding of the RB1 relay 715 is removed relay 715 is released if relay 717 has operated, but relay 717 is locked over a circuit through upper back contact of the RT relay 716 and the lower No. 2 alternate contacts of relay 717 to ground.

During the time that relay 715 is operated, a 220-ohm shunt of condenser 718 is established over its inner upper front contact and through resistor 719 and when relay 715 releases a charging circuit is established for condenser 718 extending from ground through the winding of the RT relay 716, resistance 727, over the lower No. 5 front contact of the RB2 relay 717, over the inner upper back contact of relay 715, through condenser 718 and resistor 720 to the source 721 of positive potential, whereupon the condenser is slowly charged and slowly raises the potential applied from the condenser through resistor 722 to the control cathode 723 of tube 724. After a delay of 9.6 to 17.1 seconds, this potential on the condenser and therefore on the control cathode of tube 724 will be such that the tube will break down across its control gap between cathodes 723 and 726 and the tube will become conductive causing a current flow from the source 721 across the cathode-anode gap between cathode 725 and anode 726, upper back contact of the RB1 relay 715, the lower No. 5 front contact of the RB2 relay 717, resistor 727 and to ground through the winding of the RT relay 716. Relay 716 thus becomes en rgized if the RB1 relay remains continuously released for this time period. However, if at any time before the tube fires, relay 715 is operated by a group busy indication ground from the marker, cond.nser 718 will be discharged by placing the 220-ohm resistor 719 in a short circuit around it thereby completely recycling the tube timing. When the RT relay 716 operates, it opens the locking path of the RB2 relay 717 and causes its release.

Over its six upper contacts, relay 717 when operated connects ground to leads such as 728 thereby completing circuits for the OVL relays 510 of six originating registers of the busy group. For example, the circuit for relay 510 is completed from conductor 728, over the lower back contact of the MST1 relay 218 and through the winding of the OVL relay 510 to battery. In addition, relay 717 over its lower Nos. 3 and 4 contacts establishes the circuits of a maximum of four other relays each of which when operated is effective to connect ground to twelve other conductors corresponding to conductor 728 extending to the OVL relays of other registers.

Wh.n the OVL relay 510 of any register operates, for example the register disclosed, it replaces resistor 509 through which the condenser 506 of the timer of Fig. 5 usually charges, by either of two resistors 531 or 532 dependent upon whether the PD relay 500 is operated or is not operated. This changes the time out interval while waiting the dialing of the first digit (relay 500 unoperated) from 20 to 25 seconds to 10 to 17 seconds and changes the partial dial (relay 500 is operated) to 4 to 8 seconds. When the MST1 relay 505 operates at the end of dialing, the OVL relay 510 releas.s so that the other time intervals are unchanged. Thus by shortening the time intervals the holding time of all registers is reduced.

Figure 8:
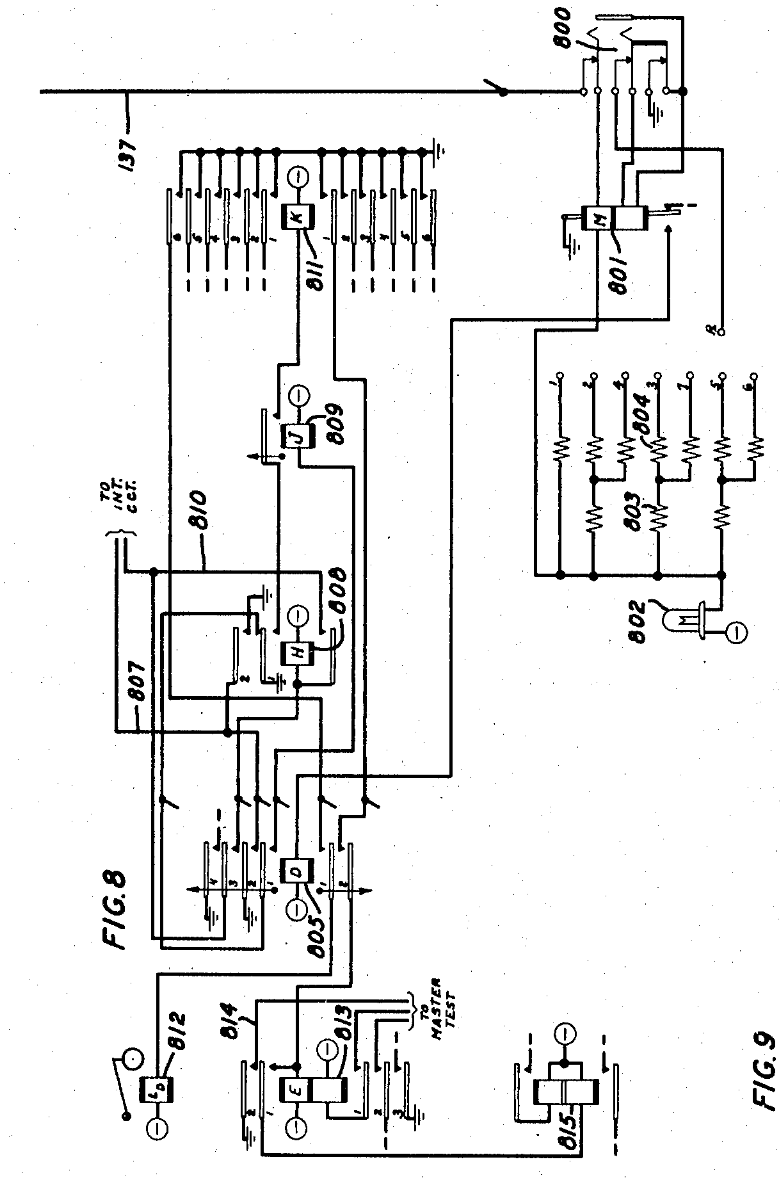
Fig. 8 shows a traffic register circuit allocated to a marker group.
Figure 9:
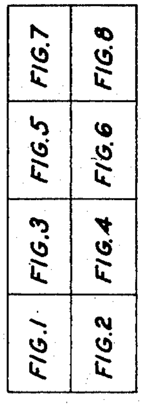
Fig. 9 is a diagram showing how the other figures of the drawing should be arranged for a complete disclosure of the invention.

The time intervals for incoming regist-rs which are seized over incoming link circuits from incoming trunks to assist in the termination of incoming calls, are reduced in the same manner through the operation of relays corresponding to the RB1, RB2 and RT relays 715, 717, and 716 except that the circuit for the RB1 relay is established from ground over the upper contact of the D relay of a traffic register, similar to that shown in Fig. 8 but allocated to a group of incoming registers.

What is claimed is:

1. In a telephone system, registers arranged in groups, means for seizing a register when idle, means responsive to the seizure of said register to mark said register as busy, group busy means operated when all of the registers of a group are marked busy, means to release said register in response to the complete operation thereof, timing means in said register, means under the control of said timing means to release said register after a predetermined interval, and means under the control of said group busy means to make said timing means effective to release said register after a shorter predetermined interval.

2. In a telephone system, registers arranged in groups, means for seizing a register when idle, means responsive to the seizure of said register to mark said register as busy, group busy means operated when all of the registers of a group are marked busy, means in said register responsive to the impulsing of a wanted line designation to register the digits of said designation, means in said register for measuring the time interval during which a first digit should be registered, means under the control of said timing means to release said register after a predetermined interval, and means under the control of said group busy means to shorten said first time interval whereby said register is rendered available sooner for another call.

3. In a telephone system, registers arranged in groups, means for seizing a register when idle, means responsive to the seizure of said register to mark said register as busy, group busy means operated when all of the registers of a group are marked busy, means in said register responsive to the impulsing of a wanted line designation to register the digits of said designation, means in said register for measuring the time interval during which any digits of a desired line designation subsequent to the first digit should be registered, means under the control of said timing means to release said register after a predetermined interval, and means under the control of said group busy means to shorten said first time interval whereby said register is rendered available sooner for another call.

4. In a telephone system, registers arranged in groups, means for seizing a register when idle, means responsive to the seizure of said register to mark said register as busy, group busy means operated when all of the registers of a group are marked busy, means in said register responsive to the impulsing of a wanted line designation to register the digits of said designation, timing means including a condenser-resistance network for measuring the time interval during which a first digit should be registered, means under the control of said timing means to release said register after a predetermined interval, and means under the control of said group busy means to reduce the resistance of said resistance-condenser network to shorten said first time interval whereby said register is rendered available sooner for another call.

5. In a telephone system, registers arranged in groups, means for seizing a register when idle, means responsive to the seizure of said register to mark said register as busy, group busy means operated when all of the registers of a group are marked busy, means in said register responsive to the impulsing of a wanted line designation to register the digits of said designation, timing means including a condenser-resistance network for measuring the time interval during which any digit of a line designation subsequent to the first digit should be registered, means under the control of said timing means to release said register after a predetermined interval, and means under the control of said group busy means to reduce the resistance of said resistance-condenser network to shorten said first time interval whereby said register is rendered available sooner for another call.

6. In a telephone system, registers arranged in groups, means for seizing a register when idle, means responsive to the seizure of said register to mark said register as busy, group busy means operated when all of the registers of a group are marked busy, means in said register responsive to the impulsing of a wanted line designation to register the digits of said designation, timing means including a condenser-resistance network for measuring a first time interval during which a first digit should be registered or for measuring a second time interval during which any digit subsequent to the first should be registered, means under the control of said timing means to release said register after a predetermined interval, and means under the control of said group busy means to reduce the resistance of said resistance-condenser network by one value if a delay has occurred in registering a first digit or by a second value if a delay has occurred in registering a subsequent digit to shorten said first or said second time interval whereby said register is rendered available sooner for another call.

7. In a telephone system, registers arranged in groups, means for seizing a register when idle, means responsive to the seizure of said register to mark said register as busy, a group busy relay operated when all of the registers of a group are marked busy, a timing means for maintaining said relay operated for a predetermined interval irrespective of the continuation of the all register busy condition, means to release said register in response to the complete operation thereof, timing means in said register, means under the control of said latter timing means to release said register after a predetermined interval, and means under the control of said group busy relay to make said latter timing means effective to release said register after a shorter predetermined interval.

JOSEPH W. DEHN.
RALPH E. HERSEY.
ARTHUR C. MEHRING.

REFERENCES CITED

The following references are of record in the file of this patent:

UNITED STATES PATENTS

| Number | Name | Date |
|---|---|---|
| 1,509,434 | Kopp | Sept. 23, 1924 |
| 1,541,386 | Polinkowsky | June 9, 1925 |
| 1,691,410 | Richardson | Nov. 13, 1928 |
| 1,729,854 | Nelson | Oct. 1, 1929 |
| 1,811,146 | Richardson | June 23, 1931 |
| 1,857,833 | Baker | May 10, 1932 |
| 1,874,684 | Wright | Aug. 30, 1932 |
| 2,486,722 | Stehlik | Nov. 1, 1949 |